Figure 1:
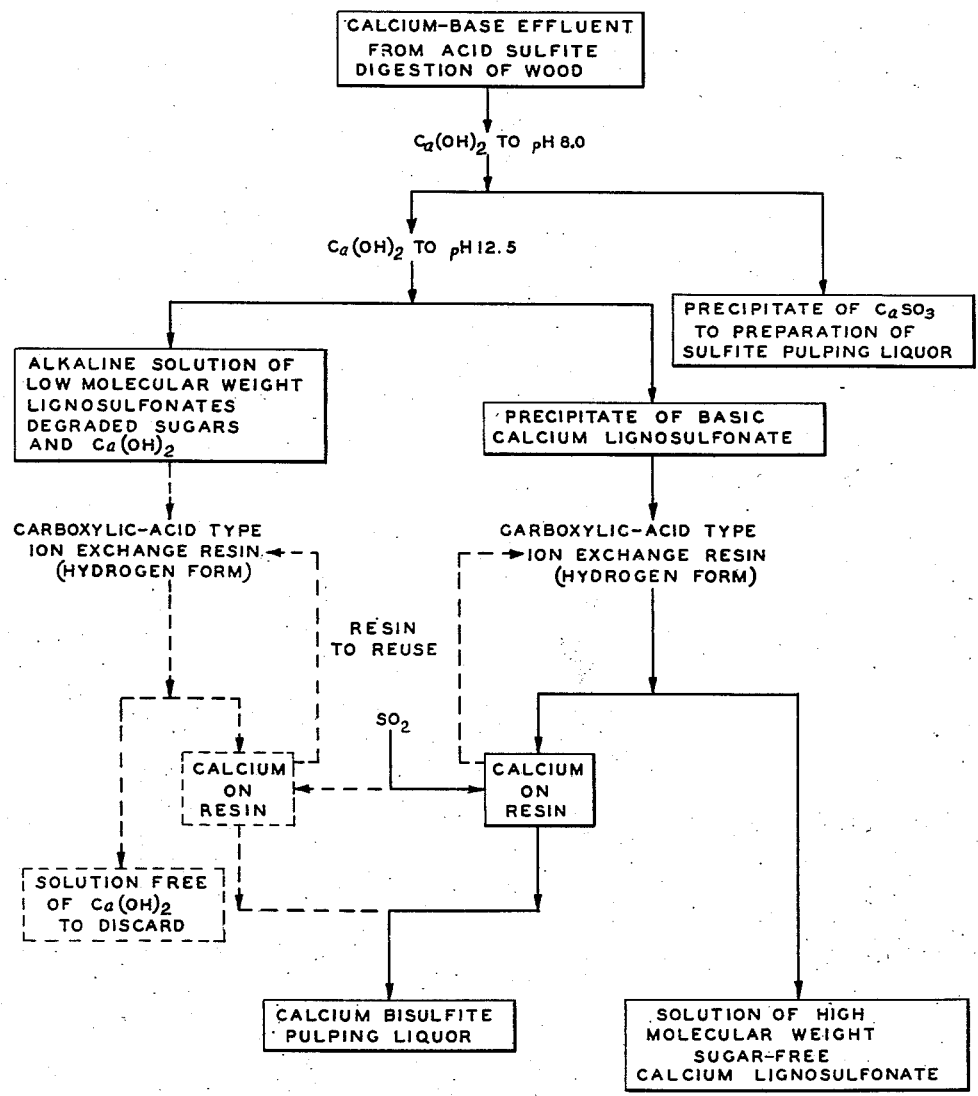

United States Patent Office 2,801,994
Patented Aug. 6, 1957

2,801,994

HIGH MOLECULAR WEIGHT CALCIUM LIGNO-SULFONATE AND PROCESS OF PRODUCING THE SAME

Kenneth Russell Gray and Hartzell Lance Crosby, Shelton, Wash., assignors to Rayonier Incorporated, Shelton, Wash., a corporation of Delaware Application November 13, 1952, Serial No. 320,224

10 Claims. (Cl. 260—124)

This invention relates to novel processes of manufacturing soluble high molecular weight calcium lignosulfonate and of separating the high molecular weight lignosulfonate from solutions containing the same and other compounds, and to the products produced thereby. In one of its aspects, the invention has special reference to the production of water soluble high molecular weight calcium lignosulfonate which is substantially free of sugars, other carbohydrates and inorganic constituents, and especially to such a product which is free from low molecular weight lignosulfonate salts. Another aspect of the invention has special reference to processes of manufacturing high molecular weight calcium lignosulfonate which are integrated with processes of separating the lignosulfonate in the form of the insoluble basic salt by the action of lime on a solution containing the lignosulfonate associated with impurities which are not precipitated in solution made alkaline with lime, and then converting all or part of the lime used to precipitate the basic salt to calcium bisulfite in a form capable of being utilized, for example, in the sulfite pulping process. The invention relates further to the utilization of the high molecular weight soluble calcium lignosulfonate as a deflocculating agent and for other purposes.

Lignosulfonates are present among other constituents of the liquors resulting from the production of wood pulp by the use of calcium-base acid sulfite. These liquors are abundantly produced in such pulping processes but the lignosulfonates contained in the liquors are admixed in water solution with sugars and other carbohydrates derived from the wood, sulfites, sulfurous acid, inorganic salts and other compounds which have heretofore made the isolation of lignosulfonates and other organic contents of the liquors difficult and costly. The various components of sulfite liquors have been so difficult or costly to recover, or they have been of such limited utility, that a large proportion of such liquors have constituted waste and they are generally designated as sulfite waste liquors. In quantity, such liquors present difficult problems of waste disposal. The need for processes for isolating and recovering various useful constituents of such liquors, either in relatively pure form or as derivatives, and of abating the problem of waste disposal has long been recognized.

An insoluble basic calcium lignosulfonate salt has been produced heretofore by treating the waste liquor from the calcium-base acid sulfite process of wood pulping with an excess of lime. Before precipitating the basic calcium lignosulfonate, the liquor is largely freed of compounds, such as sulfurous acid and sulfites, by giving it a mild treatment with calcium hydroxide. While this process effectively separates high molecular weight lignosulfonates from the low molecular weight lignosulfonates and from the carbohydrates contained in the liquor, the resulting basic calcium lignosulfonate product is insoluble and a further costly treatment with chemicals, such as sulfuric acid or other means, has been necessary to split off an excess of lime and convert the product into a soluble form. The latter treatment with sulfuric acid, however, introduces undesirable contaminants in the soluble product since the calcium lignosulfonate solution contains a considerable amount of calcium sulfate. The retained calcium sulfate in the solution is a deleterious scale-forming contaminant and is otherwise undesirable. A soluble calcium lignosulfonate with less calcium sulfate content can be prepared by using sodium bicarbonate instead of sulfuric acid to precipitate the calcium. This introduces sodium into the product which is also undesirable. In effect, such a final, sugar-free product is a mixed calcium and sodium lignosulfonate, rather than the desired calcium lignosulfonate itself. Another process of removing the excess of calcium from basic calcium lignosulfonate in order to result in a soluble product is to treat a slurry of the insoluble salt with carbon dioxide to a point where a calcium carbonate precipitate is formed and removed. This process is also costly in that it requires the use of costly apparatus to clean flue gas of ash, carbon and other constituents and operating labor, thereby resulting in considerable cost for pure, clean carbon dioxide. In consequence, there has long been a need for satisfactory and economical processes of isolating lignosulfonates from solutions in which they are associated with carbohydrates, and in particular for an improved method of converting a precipitate of basic calcium lignosulfonate into soluble calcium lignosulfonate.

We have now discovered a novel process for converting a precipitate of insoluble basic calcium lignosulfonate, substantially free from sugars, into water soluble calcium lignosulfonate. This conversion involves the use of a special type of ion exchange material or resin which has been found to adsorb the excess calcium of the insoluble basic calcium lignosulfonate from a slurry of the salt in water. The resin is then removed from the solution and the calcium adsorbed on the resin is finally removed therefrom by the action of sulfurous acid, thereby producing regeneration of the resin and a solution of calcium bisulfite and sulfurous acid which may be used directly for numerous purposes, such as the preparation of sulfite pulping liquor.

As another product of the system, calcium bisulfite suitable for use in making pulping liquor or other purposes is also obtained from the alkaline supernatant liquor of pH value 8 to 10 resulting from the original precipitation of insoluble basic calcium lignosulfonate by the action of calcium hydroxide. This supernatant solution is contacted with the carboxylic-acid type ion exchange material in acid form and the calcium is adsorbed thereon. Then the resulting calcium-containing ion exchange material is separated from the solution and finally the resin is treated with a water solution of sulfurous acid for regenerating the ion exchange material and producing the acid calcium bisulfite.

It is, therefore, among the objects of this invention to provide in isolated form a water-soluble lignosulfonate which has a high molecular weight.

Another object is to provide a novel ion exchange process in which a slurry of basic calcium lignosulfonates is contacted with an ion exchange resin to produce a solution of the normal calcium salt.

Another object is to provide a novel process for the production of such a product which does not involve the addition of extraneous or contaminating chemicals.

Another object is to provide a novel process of the kind which involves the use of lime and in which lime may be recovered as calcium bisulfite in a form suitable for use in making calcium-base sulfite liquor or for other purposes.

Another object is to provide such a novel process in which the calcium removed from the basic calcium lignosulfonate is produced directly in the form of a solution of calcium bisulfite and sulfurous acid.

A further object is to provide a novel ion exchange process for producing pure water-soluble relatively high molecular weight calcium lignosulfonate which is free from sugars, inorganic salts, and relatively low molecular weight lignosulfonates.

An other object is to prepare a water-soluble calcium lignosulfonate which is free from extraneous organic and inorganic compounds and which is suitable for use as a deflocculating agent, such as those used in the preparation of lime-base drilling muds, and as a relatively pure organic compound for other uses, such as a base material for the preparation of other salts of high molecular weight lignosulfonic acid and for the preparation of organic compounds from the lignosulfonate radical by derivative-forming or cleavage reactions.

Figure 2:
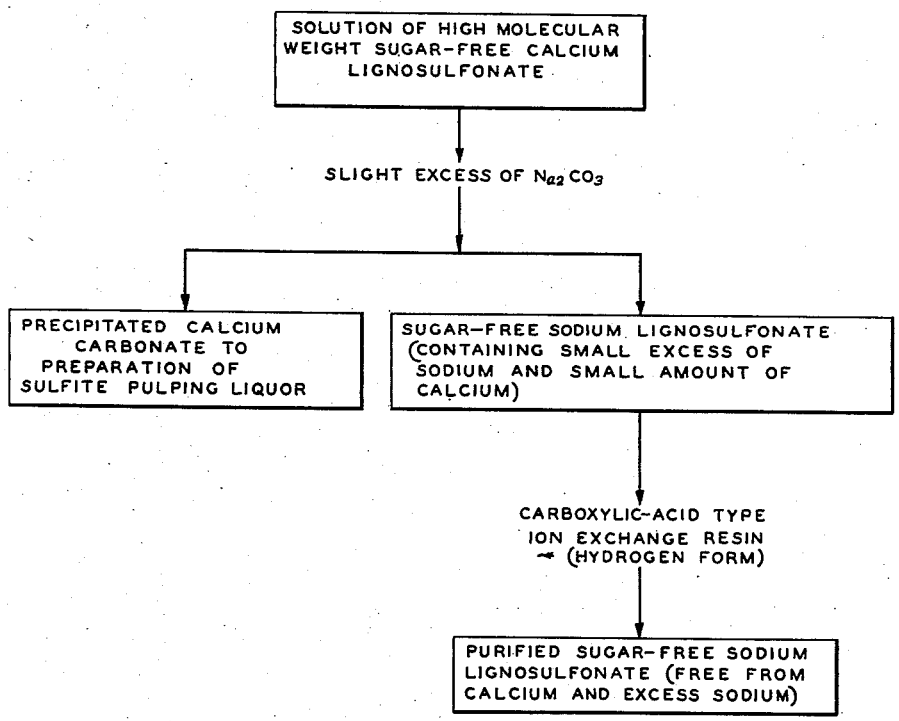

In connection with the following description of the invention, reference may be made to the drawings, in which:

Fig. 1 is a flow sheet illustrative of the present invention, and representing the course of preparation of soluble high molecular weight calcium lignosulfonate, the recovery of calcium from the supernatant solution remaining after the high molecular weight lignosulfonate is first separated from the contaminated solution in which it occurs, and the recovery of calcium from the calcium-containing ion exchange resin used to treat the slurry of basic calcium lignosulfonates, and Fig. 2 is a flow sheet illustrating one process of utilizing the sugar-free soluble calcium lignosulfonate as an intermediate from which to prepare high molecular weight sodium lignosulfonate.

In general, the invention comprises forming a precipitate of basic calcium lignosulfonate from a solution of the same containing contaminants as by the addition of an excess of lime to a calcium-base sulfite waste liquor derived from the manufacture of wood pulp which is preferably devoid of inorganic bisulfites and sulfurous acid, in order to separate insoluble basic high molecular weight lignosulfonate from other constituents, such as the sugars and low molecular weight lignosulfonates of the liquor. The basic calcium lignosulfonate is precipitated by adding calcium hydroxide until the pH value of the liquor is about 12.5. The precipitate is washed substantially free of carbohydrates, unprecipitated low molecular weight lignosulfonates and other water-soluble contaminants. The washed insoluble basic calcium lignosulfonate is separated, slurried in water, and the slurry is contacted, either concurrently or countercurrently as in a column, or batchwise, with an excess of a solid carboxylic-acid type ion exchange resin in acid form, whereupon a novel, surprising reaction takes place in the slurry, the excess of calcium in the basic salt is adsorbed on the resin and a solution of normal water soluble calcium lignosulfonate is formed.

We have also discovered that the reaction with the carboxylic-acid type ion exchange resin is self-regulatory in this process (so long as an excess of resin is present) in that the pH of the reaction mixture does not proceed to values lower than about 4 and no material amount of free lignosulfonic acid is generated by the resin.

The ion exchange resin may desirably be disposed in shallow beds in conventional ion exchange equipment for passing the slurry through the beds, or a mixture of the slurry and solid ion exchange resin may be agitated in a chamber or pipe line. A convenient arrangement is to pass the slurry upward through a series of beds of the ion exchange resin arranged in a conventional ion exchange chamber, as it has been found that in this manner the beds or layers do not tend to become plugged with the precipitate when part of the bed has become saturated with calcium.

An alternate method of operation involves a combination of the above procedures, wherein a mixture of the basic calcium lignosulfonate precipitate and the ion exchange resin is made into a slurry with water and agitated, whereupon the precipitate is substantially solubilized. Then the solution containing a small amount of dispersed, undissolved material is passed countercurrently over a separate portion of the resin to effect final purification, resulting in a completely clear solution.

For regeneration, calcium-containing resin is separated from the solution of calcium lignosulfonate and any slurry which may not have been converted, and the resin is contacted with a water solution of sulfurous acid, whereupon the resin is reconverted to its acid form and the calcium is removed in the effluent as a solution of sulfurous acid and calcium bisulfite.

To effect recovery of additional lime, the effluent resulting from the precipitation of high molecular weight basic calcium lignosulfonate may be treated with a carboxylic-acid ion exchange resin in hydrogen form to recover the calcium, whereby the pH value of the solution becomes reduced from about 12.5 to between 7 and 4. The effluent resulting from this ion exchange treatment will contain low molecular weight lignosulfonates, the degraded sugars as hydroxy acids or other organic constituents and inorganic salts, or any of these compounds. The calcium adsorbed on the resin from this solution is recovered by a similar reconditioning treatment with sulfurous acid in water solution, whereupon the remainder of the lime is recoverable as a solution of calcium bisulfite in a sulfurous acid water solution which may be used directly as make-up solution in a calcium-base sulfite pulping liquor.

Where the lignosulfonate is derived from an effluent liquor resulting from a calcium-base acid sulfite wood pulping process, the effluent liquor, or so-called waste sulfite liquor, is preferably treated (either with or without prior stripping with steam to remove the most of the sulfurous acid) with lime or calcium hydroxide until the pH value of the liquor reaches about 8 to 10, whereupon insoluble calcium sulfite is formed from components, such as inorganic sulfites and sulfurous acid. The calcium sulfite may be removed by mechanical means and reused for preparation of bisulfite digestion liquors.

In cases where it is not essential that the product be absolutely free from sulfites, it may be sufficient simply to use steam stripping to remove a portion of the $SO_2$, allowing the remaining $SO_2$ and sulfites to precipitate along with the lignosulfonate in subsequent treatment.

The solution, either substantially or in part freed from sulfurous acid and/or sulfites and containing the sugars, the high and low molecular weight lignosulfonates and other soluble materials, is finally made strongly alkaline with lime or calcium hydroxide (about pH 12.5) to precipitate the insoluble basic calcium lignosulfonate of high molecular weight. This latter serves to separate the high molecular weight lignosulfonates from the low molecular weight lignosulfonate radicals as well as from sugars and soluble inorganic salts which are not precipitated in solutions strongly alkaline with calcium hydroxide and containing an excess thereof. The calcium in this solution may be recovered as the bisulfite by treatment with the ion exchange resin and reconditioning of the resin with sulfurous acid as hereinabove described.

The purified, soluble high molecular weight calcium lignosulfonate produced in accordance with the present invention is useful as a starting material from which to produce other salts of the lignosulfonates such as sodium, potassium or ammonium, which can be conveniently done by treating a water solution of the calcium lignosulfonate with the corresponding carbonates, and thereafter removing the calcium as calcium carbonate. This can be reused to produce lime for the initial treatment of the sulfite liquor, or used directly by known methods in the production of calcium bisulfite for pulping liquor.

The solution of high molecular weight alkali lignosulfonate containing a small amount of calcium is then purified by passing it through a bed of the carboxylic-acid type ion exchange resin in acid form to remove the calcium, and this calcium may be recovered as calcium bisulfite, as described before, upon regenerating the resin with a water solution of sulfurous acid.

The ion exchange materials or resins suitable for adsorbing calcium from slurries of the insoluble basic calcium high molecular weight lignosulfonate are the carboxylic-type resins which operate as cation exchange resins with inorganic solutions and which have relatively small pores as compared to lignosulfonate molecules so that the pores of the resin do not permit such molecules to penetrate into the resin. Thus, any carboxylic-acid type ion exchange resin in acid form which operates as a cation exchange resin for inorganic cations in solution may be used.

Ion exchange resins are in general porous, cross-linked polymeric solid materials which contain ionizable groups throughout the resin which are capable of exchanging one ion for another. They may thus be considered to be solid gel structures of an ionic nature. Carboxylic-acid type ion exchange resins are such structures in which the active exchange groups are carboxylic acid groups.

The process of the invention is not limited to any particular manner of preparation of the carboxylic acid exchange resins used. However, the following are some methods whereby satisfactory carboxylic-acid type exchange resins may be prepared.

Carboxylic-acid type cation exchange resins may be prepared by polymerizing or co-polymerizing unsaturated organic acids or their anhydrides under conditions whereby cross-linked polymers are formed. Alternatively, esters of unsaturated organic acids may be polymerized to form a cross-linked resin and later saponified. Again, non-cross-linked alkali-soluble polymers containing carboxyl groups may be subjected to a cross-linking reaction to prepare an insoluble ion exchange resin. Again, carboxylic acid groups may be introduced into natural polymers not already containing these groups. In such cases, where necessary to obtain insolubility, a prior, concurrent, or subsequent cross-linking treatment would be effected. Introduction of carboxyl groups could be effected by such means as substitution of carboxyl-alkyl groups or by partial oxidation of the original structure.

Examples illustrating the operation of the invention follow:

EXAMPLE 1

A carboxylic acid type cation exchange resin especially suitable for use in the process of the present invention was made by heating to 90° C. a mixture composed of 90 ml. of styrene, 60 ml. of divinylbenzene solution containing 20% to 25% divinylbenzene dissolved in other aromatic hydrocarbons, 100 grams of maleic anhydride and 50 ml. of acetone. During a period of two hours of polymerization, the temperature of the mixture rose to 107° C. and then dropped to 90° C. At the end of the two-hour period, the temperature was raised from 90° C. to 135° C. and held at this temperature for three hours more. The reaction product was then washed thoroughly with acetone, soaked for 18 hours in 5% NaOH, then thoroughly washed with water and finally dried. The yield of product was 121 grams.

EXAMPLE 2

Calcium-base sulfite waste liquor from the production of paper-grade sulfite pulp was heated to 60° C. and treated with hydrated lime to bring the solution to a pH value of 8.0. The solution was allowed to stand overnight, during which time calcium sulfite and a small amount of lignin precipitated out. The supernatant liquor was decanted off and some additional lignin settled out upon standing overnight. Lime was then added to bring the pH value of the liquor to 12.5, whereupon a heavy precipitate of basic calcium lignosulfonate was formed. This precipitate was filtered off and was washed with several batches of hot water. The washed precipitate as slurried with cold water and passed through a column containing a carboxylic-acid type ion exchange resin, the trade name of which is Amberlite IRC-50, in hydrogen form. The resin was in uniform granular form having a screen grading of 16-50 mesh.

Upon contact with the resin, the precipitate dissolved resulting in a clear effluent from the column having a pH value of 4.2 and containing high molecular weight calcium lignosulfonate. The solution was then spray dried. The analysis of the product is shown in the first column of Table I.

The resin was regenerated into hydrogen form for reuse by passing a water solution of sulfurous acid through the column, the effluent therefrom being a water solution of calcium bisulfite and sulfurous acid.

EXAMPLE 3

Basic calcium lignosulfonate was prepared as described in Example 2, filtered off and washed. The washed precipitate was slurried with water and a portion of the carboxylic-acid type ion exchange resin in hydrogen form used in Example 2 was added. The final pH was 6.0. The product was substantially solubilized and the solution contained some dispersed, undissolved material. This was then spray dried. The analysis of this product is shown in the second column of Table I. This product compared favorably with the product of Example 2, when used as a deflocculating agent.

For comparison with the products of Examples 2 and 3, a portion of calcium-base sulfite waste liquor was simply spray dried with no further treatment. Analysis of this material is shown in column 3 of Table I.

*Table I*

ANALYSIS OF CALCIUM LIGNOSULFONATES

| Analysis | High Molecular Weight Calcium Lignosulfonates | | Entire Sulfite Waste Liquor Solids |
|---|---|---|---|
| | Prepared Using Column Ion Exchange | Slurry Ion Exchange | |
| Percent Lignosulfonic Acid (By Ultraviolet Light Absorption) | 75.3 | 78.5 | 58.9 |
| Sugars, Percent (By Chromatography): | | | |
| Glucose, Percent | ¹0.5 | ²0.5 | 6.0 |
| Mannose, Percent | 1.0 | ²0.5 | 16.5 |
| Xylose, Percent | ²0.2 | ²0.1 | 2.5 |
| Methoxyl, Percent | 8.6 | 8.3 | 7.3 |
| Ca, Percent | 4.69 | 7.25 | 3.4 |
| Na, Percent | 0.9 | 0.09 | 0.8 |
| Fe, Percent | 0.07 | 0.08 | 0.01 |
| Cu, Percent | 0.001 | 0.001 | 0.001 |
| Total Sulfur, Percent | 5.2 | 5.8 | 5.7 |
| SO₂ Sulfur, Percent | 0.17 | 2.4 | 0.7 |
| Sulfated Ash, Percent | 20.5 | 27.0 | 15.9 |

¹ Approximate value.
² Not greater than this value.

The soluble high molecular weight calcium lignosulfonate prepared in accordance with the present invention is especially effective as a deflocculating agent in the making of lime-base oil and gas well drilling muds.

EXAMPLE 4

A stock solution of clay for the preparation of a lime-base drilling mud was prepared by mixing 275 gm. Wyoming Bentonite, 825 gm. native Texas clay, and 9000 gm. water and stirred at slow speed for 2 hours. The mixture was aged 72 hours without stirring and was subsequently mixed 0.5 hour at slow speed.

This mixture, when treated with lime and an additive, constitutes a typical lime-base mud. A 600 cc. portion of this mud was mixed for 5 minutes at high speed with a mixture containing 5.1 gm. calcium hydroxide, 20 gm. water, 5.1 gm. NaOH (equivalent to 3 lbs. NaOH per bbl.

mud), and 5.1 gm. of the high molecular weight sodium lignosulfonate (equivalent to 3 lbs. sodium lignosulfonate per bbl. mud). Like the product of Example 3, the final mixture was tested by the standard procedures of the American Petroleum Institute.

A second comparison was carried out exactly similar to the above except using as the additive sodium lignosulfonate recovered by the process of pending application of Lloyd E. Van Blaricom and Kenneth Russell Gray, Serial No. 223,182, filed April 27, 1951, which represents a low molecular weight fraction of the lignosulfonate content of sulfite waste liquor.

For a still further comparison, another similar experiment was carried out by using as the additive low molecular weight calcium lignosulfonate prepared from the above sample of low molecular weight sodium lignosulfonate by a cation exchange of calcium for sodium.

The results of these tests are shown in Table II.

*Table II*

| Additive | Quantity of Additive, lb./bbl. | Properties of Mud-Additive Mixtures | | | |
|---|---|---|---|---|---|
| | | Viscosity, Centipoises | Gel Strength, g. | | Filt., ml., 30 min. |
| | | | 0 min. | 10 min. | |
| None | 0 | (¹) | (¹) | (¹) | (¹) |
| High Molecular Weight Calcium Lignosulfonate of Invention | 3 | 19.3 | 17.0 | 176.0 | 16.0 |
| Low Molecular Weight Sodium Lignosulfonate Recovered by Ion Exchange | 3 | 38.0 | 87.0 | 187.0 | 20.5 |
| Low Molecular Weight Calcium Lignosulfonate | 3 | 23.4 | 34.2 | 230.2 | 16.5 |

¹ Too high to test.

The above results show that both the presence of low molecular weight lignosulfonates and the presence of sodium ions are detrimental to the use of lignosulfonate as defluocculating agents, and that the soluble high molecular weight calcium lignosulfonate of Example 3 is an excellent deflocculating agent for use in lime-base drilling muds. In a similar manner the water soluble high molecular weight calcium lignosulfonate of the kind made in accordance with the present invention is suitable for deflocculating any lime-base drilling mud, and in all cases the processes herein disclosed are applicable.

In general, the molecular weight of polymeric materials such as those produced by the processes of the present invention vary approximately inversely as the cube of the diffusion coefficient, as determined by methods such as the one hereinafter described. Accordingly, the diffusion coefficient of the entire lignosulfonate content of sulfite waste liquor and the average diffusion coefficient of a typical high molecular weight calcium lignosulfonate produced by the processes of the present invention (which is very effective as a deflocculating agent in lime-base drilling muds) were measured according to the general procedure published for lignosulfonates by Felicetta, Markham, and McCarthy in the Journal of the American Chemical Society, vol 71, page 2879, August 1949. The average diffusion coefficient of the low molecular weight sodium lignosulfonate, recovered by ion exchange and found to be relatively ineffective as a defloccculant for lime-base drilling muds, was also measured. It was found that the average diffusion coefficient of a typical calcium lignosulfonate of the present invention was about 16.5 which represents a molecular weight of about 5120, whereas the corresponding average diffusion coefficient for the entire lignosulfonate content of the typical calcium-base sulfite waste liquor used as the source of the high molecular weight material was 20.4, representing a molecular weight of 2710. The diffusion coefficient of the sodium lignosulfonate isolated by ion exchange and made from the product of Van Blaricom and Gray, Serial No. 223,182, mentioned in Example 4, was 25.1 which represents a molecular weight of about 1460.

Several modifications were made in the method and apparatus used by Felicetta, Markham and McCarthy for determinating the diffusion coefficient which involved adding a quartz lens to a Beckman Model DU Spectrophotometer and focusing the image of the light emitting slit sharply on the diffusion coefficient cell. Secondly, since the soluble sulfonated products of the invention are polydisperse, it was necessary to measure the average diffusion coefficient in a purely arbitrary but reproducible manner as described in the specific procedure given below.

The following specific procedure was employed for the determination of the average diffusion coefficient D in millimeters squared per day. This value is used in the formula hereinafter set forth for calculating the corresponding molecular weight.

An aqueous solution containing 0.02 mol of KCl/liter and 0.2% of the lignosulfonate salt was allowed to diffuse upward into a quartz cell 2 mm. thick and 60 mm. long with an open end 2 mm. × 12 mm. filled with an aqueous agar gell containing 0.75% agar and 0.02 mol KCl/liter for about 24 hours. The solution and gel were maintained at 25.00° C. ± 0.05° C. whilst maintaining a gentle rocking motion. The volume of solution was relatively large so that no significant concentration change in the solution occurred during the diffusion. The cell was then removed from the solution and the concentration of lignosulfonate in the column of gel was determined spectrophotometrically at predetermined distances from the exposed surface of the gel as follows: The cell was placed in a holder constructed with means for removing the cell past the exit slit of an ultraviolet spectrophotometer. A screw and a vernier scale on the holder served to position the column of gel so that the light from the slit would pass through the gel at the predetermined points. Ultraviolet light of wavelength 281.7 millimicrons and constant intensity was passed through the exit slit of the spectrophotometer and the image of the slit was focused with a quartz lens so that the focal plane was within the 2 mm. thickness of gel. After focusing and passing through the cell, the ultraviolet light was projected into a suitable photoelectric cell of the photometer and the output current of the photoelectric cell was expressed using Beer's Law as uncorrected values of concentration of the diffused sulfonated bark aromatic materials. Values of concentration at the same predetermined distances and temperature were similarly obtained using only the 0.75% agar gel 0.02 N in KCl in the cell as the material tested. The latter values were then subtracted from the uncorrected concentrations to obtain the corrected values.

The value of D was calculated by plotting the corrected values of concentration, $C_x$, against $x$, the corresponding distances in millimeters from the surface of the gel where they were determined. The curve thus obtained was extended to the $x$ coordinate to obtain the value of $C_0$, the concentration of sulfonated bark aromatic materials at the surface of the gel. The ratios $C_x/2C_0$ were then calculated at the corresponding distances, and were plotted on one-half the probability scale of a standard Gaussian probability graph with values of $x$ as the linear coordinate.

In order to obtain an arbitrary average coefficient, the values of $C_x/2C_0$ were read from the second curve where $x=10$ mm. Then from a previously prepared linear plot of $C_x/2C_0$ vs. Dt. where $t=$time in days, $$C_x/2C_o = \frac{1-q}{2}$$

and $q$ is the probability integral. The probability integral $q$ is $$\frac{2}{\sqrt{\pi}} \int_0^{\frac{x}{\sqrt{4Dt}}} e^{-\beta^2} \alpha\beta$$

and values of $q$ are obtained from "Tables of Probability Functions," United States National Bureau of standards (1941). D was finally obtained by dividing $Dt$ by $t$.

Relative molecular weights may be determined from the values of D obtained by the foregoing method by applying the Stokes-Einstein equation which assumes spherical noninteracting, nonhydrated molecules.

$$M = \frac{K}{D^3} \text{ and } K = \frac{(RT)^3 \rho}{162 \pi^2 \eta^3 N^2}$$

where M is molecular weight, R is the gas constant, T is absolute temperature, N is Avogadro's number, $\rho$ is the density of the molecule and $\eta$ is the viscosity of the solution. Under the conditions which our measurements were made, $K = 23 \times 10^6$. By applying this formula to the values of D of the products of the first and third experiment of Example 1 and to a low molecular weight sodium lignosulfonate fraction isolated by ion exchange made in accordance with the disclosure noted in Example 2, the molecular weights shown in Table III were obtained.

Table III
AVERAGE MOLECULAR WEIGHTS OF LIGNOSULFONATES PREPARED FROM SULFITE WASTE LIQUOR

|  | Average Diffusion Coefficient of Material (mm.²/day) | Average Molecular Weight |
|---|---|---|
| Entire Lignosulfonate Content of Sulfite Waste Liquor | 20.4 | 2,710 |
| High Molecular Weight Calcium Lignosulfonate (Isolated from above sulfite waste liquor by process of the invention) | 16.5 | 5,120 |
| Low Molecular Weight Sodium Lignosulfonate (Isolated from sulfite waste liquor by ion exchange) | 25.1 | 1,460 |

As noted above, the soluble high molecular weight calcium lignosulfonate prepared in accordance with the present invention is especially useful in preparing calcium-base drilling muds.

In conventional procedures of drilling oil and gas wells, particularly when rotary drills are used, it is common practice to circulate around the drill in the bore hole a fluid known as a drilling mud. The drilling mud serves a number of functions, among which are the carrying of the bit cuttings out the bore hole, lubricating the drill pipe and drilling tool, and providing a hydrostatic head in the well to prevent the uncontrolled escape of gases or liquids into the bore hole from various earth formations encountered during drilling. The drilling mud also operates to form a cake which plasters out on the wall of the bore hole and forms a somewhat impervious lining which serves to seal or plug-up permeable formations, thereby preventing the loss of fluid from the well bore outwardly into the permeable formations being drilled. The drilling mud must also have a suitable low viscosity so it can be readily circulated. The normal procedure during drilling is to circulate the mud down through the interior of the rotating tubular drill shaft or drill pipe and from thence to the surface through the annulus between the drill pipe and the wall of the bore hole. The drilling fluid issuing from the well is usually passed over a screen and then through a ditch or trough to a mud settling pit, to be recirculated through the drill pipe by suitable pumps. The muds are treated with suitable agents to give them the desired properties before they are pumped into the bore holes and, if need be, before they are recirculated.

In general, common drilling muds are prepared by dispersing hydratable clays in a water base and, if desired, suspending weighting materials such as barytes therein to increase the weight of the mud to the desired value. Then, in order that the drilling mud will perform its desired functions properly, it is essential that it have certain other properties or characteristics not possessed by the original suspension, and that these be maintained in proper balance throughout the drilling operation. The gel forming and viscosity characteristics of the drilling fluid are by far the most important.

The ability to form a gel upon standing and yet readily revert to the fluid state upon agitation (also called thixotropy) is important in preventing the weighting materials from settling out in the mud pits and also in preventing cuttings from settling to the bottom of the bore hole and possibly causing the drill pipe to stick whenever the drilling operation is suspended for any reason. While the gel rate and gel strength of the mud should be sufficient to thus prevent settling of the cuttings within the bore hole and also to prevent settling of weighting materials in the mud pits, it should not be so high as to cause excession gelation in the mud ditch and mud pits. Also, if gelation is excessive, it may be difficult or impossible to run an instrument down the well in case it is desired to log the well or determine its inclination or the like. In such case it may also be difficult to resume circulation of the drilling mud.

The viscosity is furthermore important in that it must of necessity be sufficiently low so that the mud is readily pumpable and so that cuttings and sand in the mud circulating out of the well will settle out in the settling pits. If the viscosity is too low, however, the mud may be easily lost into the porous formations transversed by the bore hole and the larger drill cuttings may accumulate in the bore hole rather than accompany the circulating fluid. In addition to its adverse effect on pumpability and sedimentation, high viscosity may tend to cause the mud to become "gas cut" through failure to properly release gas at the surface.

Still another important property of the drilling mud is its filtration characteristics or ability to "plaster out" on the bore hole wall and form a filter cake giving a minimum of water loss. It is desirable that the water loss be as low as possible. If the water loss is high, a thick filter cake will be formed on the wall of the bore hole and may cause sticking of the drill pipe.

It is general practice in the earlier stages of a well drilling operation to employ a sodium-base mud in which hydratable sodium clays are dispersed, usually in the presence of caustic soda and a deflocculant. In many cases, however, as drilling proceeds, conditions are encountered which tend to cause excessive increases in viscosity and gel properties. These tendencies are avoided or minimized by converting the mud to a calcium-base mud (known also as a lime-base mud). For example, when the drilling mud is subject to contamination by ordinary salt or by calcium salts, as in drilling through anhydride or gypsum or in drilling out a cement plug, difficulty will be experienced in effecting proper control of the viscosity and gel properties of a sodium-base mud. In such cases it often will be advantageous to convert the mud to the calcium form by addition of lime so as to render the mud less susceptible to changes in properties by contamination. When a calcium-base mud is formed, it is necessary to have also present an additive which will be very effective in reducing its viscosity and gel strength. Otherwise the mud would become unworkable and stiff. In lime-base muds the effectiveness of the thinner on water loss properties has usually been considered less important because such muds are generally treated additionally with colloidal materials such as starch or carboxymethyl cellulose which very effectively reduce the water loss.

The high molecular weight soluble calcium lignosulfonates made in accordance with the present invention are effective deflocculating agents for controlling the viscosity of lime-base drilling muds. They are especially useful in that they are compatible with such colloidal water loss control materials as starch and carboxymethyl cellulose.

Physical properties of drilling muds may be tested in the laboratory by procedures developed by the American Petroleum Institute, as described in "Recommended Practice for Standard Field Procedure for Testing Drilling Fliuds," (API, RR 29, 3rd. ed., May 1950). Important properties which are determined in the laboratory include viscosity, 0 and 10 minute gel strengths and filtration loss (often also termed "water loss," "filter loss," or simply "filtration"). The viscosity may be determined by using a Stormer viscometer under standardized conditions. The values given herein were so determined.

The zero gel strength, "0 Gel Strength," is the resistance of freshly stirred mud to the initiation of flow. This is measured with the Stormer viscometer. The "10 Minute Gel Strength" is the resistance to initiation of flow of a mud that has been allowed to stand 10 minutes. Thus, the 0 and 10 minute gel strengths indicate the gel forming characteristics of the mud and give a measure of gel rate as well as gel strength. Filtration loss is a test in which a mud cake is formed by filtration and pressed against a filter permeable to water. Briefly, it comprises measuring the total volume of filtrate water obtained during a given time of pressure filtration which may conveniently be thirty minutes. This test serves to measure the ability of a drilling mud to form a thin filter cake on the bore hole wall to seal it off and thereby prevent loss of water to formation being drilled. These laboratory evaluations indicate the kind and amounts of different materials to add to the muds in order that the muds will have the desired operating characteristics. Thus, if the value of gel strength and/or viscosity is high, the need of deflocculation is indicated. This may be accomplished in a lime-base mud, as illustrated in Example 4, by adding to the mud a suitable amount of the soluble calcium lignosulfonate which is made in accordance with the present invention.

We claim:

1. The process of producing a water soluble high molecular weight calcium lignosulfonate which comprises forming a slurry of insoluble basic high molecular weight calcium lignosulfonate with water and contacting the slurry with a carboxylic-acid type ion exchange material in the hydrogen form until calcium is adsorbed by said material and normal calcium lignosulfonate is formed in water solution.

2. In a process which comprises treating a water slurry of water-insoluble basic calcium lignosulfonate with a carboxylic-acid type cation exchange material in acid form for adsorbing calcium and transforming said lignosulfonate to its normal soluble salt; the steps which comprise agitating a mixture of said ion exchange material and said slurry, separating the resin from said agitated mixture; and then treating the resulting solution with another portion of the ion exchange material to effect a further separation.

3. The process of manufacturing water soluble high molecular weight calcium lignosulfonate from a solution which contains the same in association with contaminating compounds which do not form insoluble calcium salts in alkaline water solutions of pH about 12.5 made alkaline with calcium hydroxide, which comprises adding calcium hydroxide to the solution until the high molecular weight lignosulfonate is precipitated as the insoluble basic salt, separating said insoluble salt from the supernatant solution; mixing said insoluble salt with water to form a slurry, contacting the slurry with a carboxylic acid ion exchange material in hydrogen form until normal water-soluble calcium lignosulfonate is formed from said insoluble salt and separating the solid calcium-containing ion exchange resin from the resultant water solution thus formed.

4. The process in accordance with claim 3 which comprises contacting said supernatant solution with another portion of the ion exchange resin in acid form and removing the calcium from said solution; and then contacting the latter calcium-containing resin and the calcium-containing resin first produced with a water solution of sulfurous acid until the resins are reconverted to acid form and the calcium is removed as a solution of calcium acid sulfite.

5. The process of manufacturing water soluble high molecular weight calcium lignosulfonate from an effluent liquor from a calcium-base acid sulfite digestion of wood which contains in solution said lignosulfonate associated with a compound of the group consisting of sulfurous acid, inorganic sulfites and other contaminating compounds, which comprises adding calcium hydroxide to the liquor until a pH value of about 8 is produced for forming insoluble calcium sulfite and for producing a solution containing said lignosulfonate associated with contaminants which do not form insoluble calcium salts in alkaline solutions made alkaline with lime; separating said last-named solution from said calcium sulfite and adding calcium hydroxide thereto until the high molecular weight lignosulfonate is precipitated as the insoluble basic calcium salt thereof; separating the insoluble basic calcium salt thus precipitated from the solution and mixing said insoluble salt with water to form a slurry, contacting the slurry with a carboxylic acid ion exchange resin in hydrogen form until normal soluble calcium lignosulfonate is formed from said insoluble salt and separating the solid calcium-containing ion exchange resin from said solution.

6. The process of separating sugar-free high molecular weight water-soluble calcium lignosulfonate from effluent liquor from the calcium-base sulfite digestion of wood which comprises precipitating basic calcium lignosulfonate from said liquor; removing said precipitate and washing the same for removing sugars; adding the sugar-free precipitate to water to form a slurry; and then contacting the slurry with a carboxylic acid ion exchange resin in hydrogen form until normal water-soluble calcium lignosulfonate is formed.

7. In a process which comprises forming a precipitate of basic calcium lignosulfonate from a solution containing lignosulfonates in solution and thereafter adsorbing calcium directly from the precipitate by reaction with a carboxylic-acid type ion exchange resin in acid form; the restoration of said resin to said acid form from its form in which calcium is adsorbed thereon, which comprises contacting the latter form of the resin with a water solution of sulfurous acid until the calcium is removed in solution as calcium acid sulfite.

8. The process of manufacturing lignosulfonates of the alkalis of the group consisting of the fixed alkali metals and ammonia which comprises adding the carbonate of said alkali to a water solution of calcium lignosulfonate until calcium is precipitated as calcium carbonate, and then contacting the resulting solution with a carboxylic-acid type ion exchange resin in hydrogen form for removing residual calcium from the solution.

9. A water-soluble high molecular weight calcium lignosulfonate having a diffusion coefficient D of about 16.5 millimeters squared per day, being substantially free of calcium sulfate, sodium salts and sugars; and resulting from adding lime to a solution containing said lignosulfonate associated with contaminants which do not precipitate in solutions containing calcium hydroxide and having a pH value higher than 10, adding an excess of calcium hydroxide to said solution until insoluble basic calcium lignosulfonate is precipitated, separating the precipitate from the supernatant liquor, forming a slurry by mixing said precipitated basic calcium lignosulfonate with water, contacting the slurry with a carboxylic-acid type ion exchange material in acid form until calcium is adsorbed by said material and a solution of normal calcium lignosulfonate is formed.

10. A water-soluble high molecular weight normal calcium lignosulfonate bearing material produced according to the process of claim 1 which is equivalent to around 75% and more of lignosulfonic acid, and comprising less than 2% of sugars, less than 1% of the total of sodium, iron and copper, from around 4% to 8% of calcium, around 8% methoxyl, total sulfur around 5% and sulfated ash from 20% to 27%.

References Cited in the file of this patent

UNITED STATES PATENTS

| | | |
|---|---|---|
| 1,981,176 | Howard | Nov. 20, 1934 |
| 2,371,136 | Harmon | Mar. 13, 1945 |
| 2,445,838 | Melander et al. | July 27, 1948 |
| 2,491,436 | Barnes | Dec. 13, 1949 |
| 2,491,437 | Perkins | Dec. 13, 1949 |
| 2,710,254 | Van Blaricom et al. | June 7, 1955 |
| 2,710,255 | Van Blarisom et al. | June 7, 1955 |